US012571353B2

(12) United States Patent
Abedinpour Fallah

(10) Patent No.: US 12,571,353 B2
(45) Date of Patent: Mar. 10, 2026

(54) SINGULAR VALUE DECOMPOSITION-BASED METHOD FOR CONSTRAINED CONTROL OF GAS TURBINE ENGINES

(71) Applicant: Pratt & Whitney Canada Corp., Longueuil (CA)

(72) Inventor: Mehdi Abedinpour Fallah, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 160 days.

(21) Appl. No.: 18/354,918

(22) Filed: Jul. 19, 2023

(65) Prior Publication Data

US 2025/0027456 A1     Jan. 23, 2025

(51) Int. Cl.
*F02C 9/50*          (2006.01)
*B64D 31/00*         (2006.01)
*F02C 6/20*          (2006.01)

(52) U.S. Cl.
CPC .............. *F02C 9/50* (2013.01); *B64D 31/00* (2013.01); *F02C 6/20* (2013.01)

(58) Field of Classification Search
CPC ..... F02C 9/50; F02C 6/20; F02C 9/00; B64D 31/00; F05D 2270/71; G06F 17/11; G06F 17/16; G05B 13/048
See application file for complete search history.

(56) References Cited

U.S. PATENT DOCUMENTS

| | | | |
|---|---|---|---|
| 6,882,889 B2 | 4/2005 | Fuller et al. | |
| 7,860,635 B2 | 12/2010 | Litt | |
| 8,262,352 B2 * | 9/2012 | Gainford | B64C 11/48 |
| | | | 416/162 |
| 8,364,340 B2 | 1/2013 | Nestico et al. | |
| 9,437,054 B2 * | 9/2016 | Catt | F01D 17/02 |
| 10,113,487 B2 | 10/2018 | Cai et al. | |
| 10,961,921 B2 | 3/2021 | Tang | |
| 12,077,278 B1 * | 9/2024 | Duranleau-Hendrickx | |
| | | | B64C 11/301 |

(Continued)

FOREIGN PATENT DOCUMENTS

EP          3392486 A1    10/2018

OTHER PUBLICATIONS

Demmel, James, "Jacobi's method is more accurate than QR," Kreimir Veselić, Lehrgebiet Mathematische Physik, Hagen, West Germany.

(Continued)

*Primary Examiner* — Mussa A Shaawat
(74) *Attorney, Agent, or Firm* — Carlson, Gaskey & Olds, P.C.

(57)          ABSTRACT

A disclosed method for controlling an aircraft propulsion system includes modeling dynamics of a propulsion system, formulating a problem for achieving the target output as system of linear equations constrained by physical limits of the propulsion system, and generating a solution to the system of linear equations with a singular value decomposition solver module that utilizes Jacobi's singular value decomposition. A control command is generated based on the solution that includes instructions for adjusting a propulsion system operating parameter toward a target output and the propulsion system us operated according to the control command.

19 Claims, 4 Drawing Sheets

(56)                    References Cited

U.S. PATENT DOCUMENTS

| | | | | |
|---|---|---|---|---|
| 2004/0102890 A1* | 5/2004 | Brunell | ................ | G05B 13/048 |
| | | | | 701/100 |
| 2013/0074519 A1* | 3/2013 | Ertz | ........................ | F02C 7/057 |
| | | | | 60/802 |
| 2014/0020460 A1* | 1/2014 | Ertz | ........................ | F01D 21/12 |
| | | | | 73/114.55 |
| 2016/0059960 A1* | 3/2016 | Fearn | ................... | B64C 27/022 |
| | | | | 244/17.11 |
| 2017/0210461 A1* | 7/2017 | Siu | .......................... | B64C 27/82 |
| 2018/0050816 A1* | 2/2018 | Yakobov | ................. | B64C 11/30 |
| 2018/0300191 A1* | 10/2018 | Bengea | .............. | G06F 11/0703 |
| 2020/0062413 A1* | 2/2020 | Feddersen | .............. | B64D 31/18 |
| 2020/0079517 A1* | 3/2020 | Terwilliger | ............... | F02C 9/20 |
| 2020/0248622 A1* | 8/2020 | Crowley | ............. | G05B 13/027 |
| 2021/0394916 A1* | 12/2021 | Baig | ........................ | H02J 9/061 |
| 2022/0243608 A1* | 8/2022 | Krzywon | ............... | B64C 11/38 |
| 2022/0243610 A1* | 8/2022 | Krzywon | ............. | F01D 21/003 |
| 2023/0174220 A1* | 6/2023 | Albrecht | .............. | B64C 11/385 |
| | | | | 416/156 |
| 2024/0067347 A1* | 2/2024 | Kumar | ...................... | F02C 6/00 |
| 2024/0343399 A1* | 10/2024 | Amari | .................. | B64D 45/00 |
| 2024/0383612 A1* | 11/2024 | Hirsch | .................. | B64D 31/00 |

OTHER PUBLICATIONS

Extended European Search Report for European Application No. 24189901.2 mailed Dec. 20, 2024.

Zlatko, Drma C. et al., "New Fast and Accurate Jacobi SVD Algorithm: I", Jul. 24, 2006, pp. 1-39, URL: https://web.archive.org/web/20060724183303if_/http://www.fernuni-hagen.de:80/MATHPHYS/veselic/downloads/j0.pdf.

* cited by examiner

SINGULAR VALUE DECOMPOSITION-BASED METHOD FOR CONSTRAINED CONTROL OF GAS TURBINE ENGINES

TECHNICAL FIELD

The present disclosure relates to a control system for dynamically controlling operation of a gas turbine engine.

BACKGROUND

Aircraft and turbine engines have physical limits that are observed to maintain satisfactory operation. Such physical limits vary during operation. However, control systems for aircraft and turbine engines are capable of generating outputs that command operation outside of such physical limits. Accordingly, multi-variable systems that use dynamic inversion means are incorporated into control systems to limit operation within physical constraints. Constrained model-based control systems may be based on a solver system that utilizes a QR matrix decomposition for generating output commands. Although such a matrix decomposition provides adequate results, more accurate and robust methods of generating output commands in a multivariable system may be possible.

Turbine engine manufacturers continue to seek further improvements to engine performance including improvements to control systems.

SUMMARY

A method for controlling an aircraft propulsion system according to an exemplary embodiment of this disclosure includes, among other possible things receiving a target output for at least one propulsion system operating parameter, receiving operation information indicative of at least one measured engine operating parameter, modeling dynamics of the propulsion system with a system model, formulating a problem for achieving the target output as system of linear equations are constrained by physical limits of the propulsion system, generating a solution to the system of linear equations with a singular value decomposition solver module that utilizes Jacobi's singular value decomposition. generating at least one control command that is based on the generated solution, the at least one control command includes instructions for adjusting that at least one propulsion system operating parameter toward the target output, and operating the propulsion system according to the at least one control command.

A control system for an aircraft propulsion system according to another exemplary embodiment of this disclosure includes, among other possible things, a controller with a processor and a memory for storing control logic for generating control commands for operating a propulsion system. The controller is programmed to receive a target output for at least one propulsion system operating parameter, to receive operation information indicative of at least one measured engine operating parameter, to model dynamics of the propulsion system with a system model, to formulating a problem for achieving the target output as system of linear equations are constrained by physical limits of the propulsion system, to generate a solution to the system of linear equations with a singular value decomposition solver module that utilizes Jacobi's singular value decomposition to generate at least one control command that is based on the generated solution. The at least one control command includes instructions for adjusting propulsion system operating parameters toward the target output, and to operate the propulsion system according to the at least one control command.

An aircraft propulsion system according to another exemplary embodiment of this disclosure includes, among other possible things, a turbine engine configured to generate a propulsive thrust based on at least one performance target, and a controller that includes a processor and a memory for a storing a constrained model-based control system for generating control commands for operating the turbine engine. The controller includes a constrained model-based controller that has an engine model, an optimization formulation module and a solver module. The controller is programmed to receive a target output for at least one turbine engine operating parameter, to receive operation information that is indicative of at least one measured engine operating parameter, to model dynamics of the turbine engine with a system model, to formulate a problem for achieving the target output as a system of linear equations that is constrained by physical limits of the turbine engine, and to generate a solution to the system of linear equations with a singular value decomposition solver module utilizing Jacobi's singular value decomposition. The controller is further programmed to generate at least one control command based on the generated solution that includes instructions for adjusting at least one turbine engine operating parameter toward the target output, and to operate the turbine engine according to the at least one control command.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
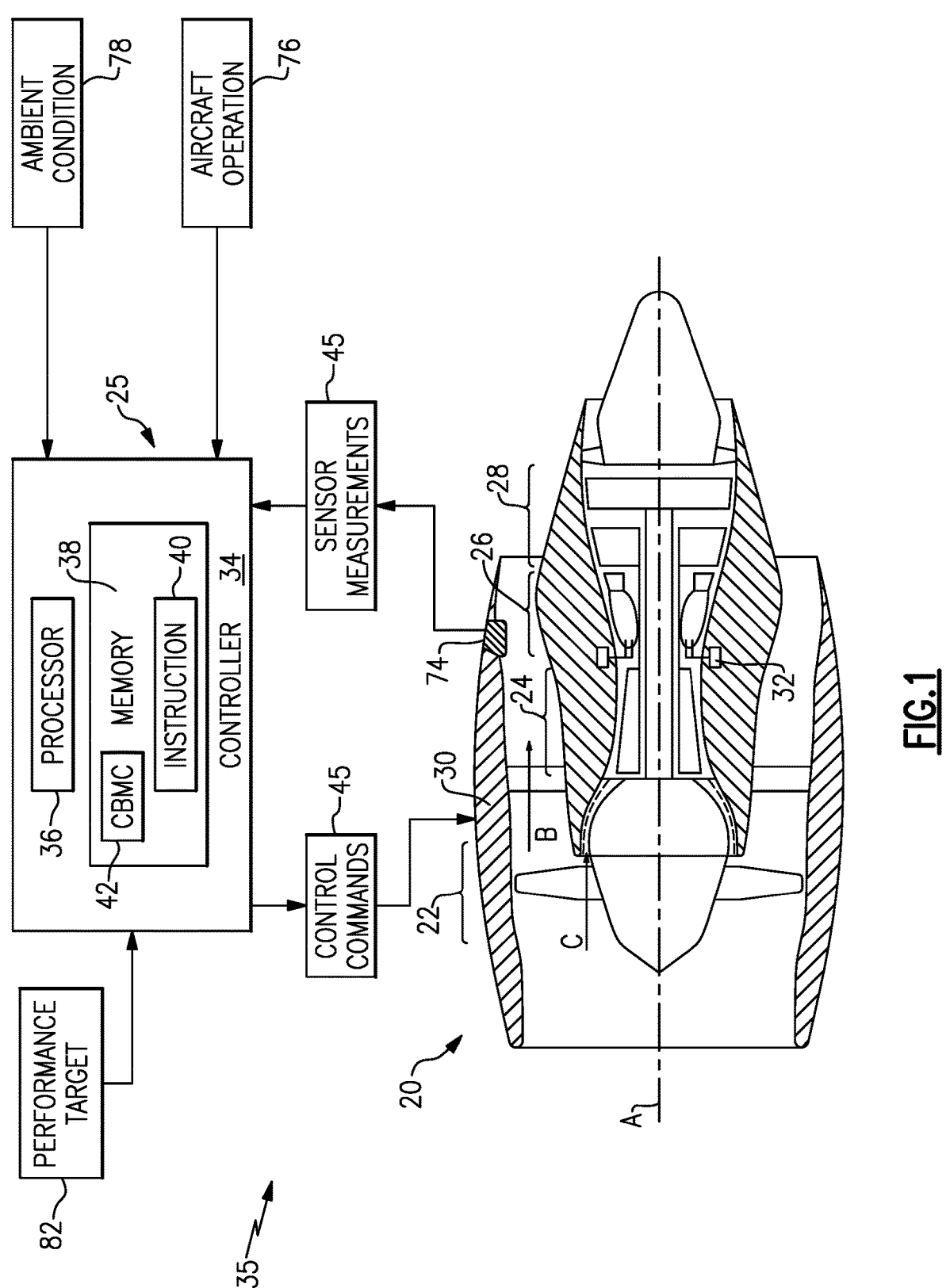
FIG. 1 is a schematic view of an example gas turbine engine.

FIG. 1 schematically illustrates an aircraft propulsion system 35 having a gas turbine engine 20 and a control system 25. The control system 25 includes a constrained model-based control system (CMBC) 42 that utilizes a Jacobi singular value decomposition (SVD) method for solving a constrained optimization problem and generate control commands 45 for operating the propulsion system 35 and engine 20.

The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The compressor section 24 drives air along a core flow path C into the compressor section 24 for compression and communication into the combustor section 26. In the combustor section 26, the compressed air is mixed with fuel from a fuel system 32 and burnt to generate an exhaust gas flow that expands through the turbine section 28 and is exhausted through exhaust nozzle.

Although depicted as a turbofan turbine engine in the disclosed non-limiting embodiment, it should be understood that the concepts described herein are not limited to use with turbofans as the teachings may be applied to other turbine engine and aircraft propulsion system architectures, for example turboshaft and turboprop turbine engines.

The control system includes a controller 34 with a processor 36 and a memory device 38. The example controller 34 relates to a device and system for performing necessary computing or calculation operations of the control system 25. The controller 34 may be specially constructed for operation of the control system 25, or it may comprise at least a general-purpose computer selectively activated or reconfigured by software instructions 40 stored in the memory device 38. The controller 34 may further be part of full authority digital engine control (FADEC) or an electronic engine controller (EEC).

The CBMC system 42 may be implemented as control logic stored in the memory device 38. The disclosed memory device 38, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 40 in the memory device 38 may include one or more separate programs, each of which includes an ordered listing of executable instructions for implementing logical functions. Software in memory, in whole or in part, is read by the processor 36, and executed to generate the control commands 45. The control commands 45 are provide to the engine 20 and more specifically to specific actuators of the engine 20 that control engine operation.

The example control system 25 further includes all devices that operate to communicate with the engine assembly 20 and implement the control commands 45 to control engine operation. The control system 25 receives information indicative of engine operating conditions from at least one sensor system 74. The at least one sensor system 74 communicates sensor measurements 44 to the control system 25 for use in generating the control commands 45. Additionally, information indicative of aircraft operation 76 and ambient conditions 78 may also be communicated to the control system 25.

While the example control system 25 is disclosed by way of example as controlling the propulsion system 35 and engine 20, the control system 25 may be utilized to control other aircraft and ground based systems.

The example propulsion system 35 is operable within physical limits that vary based on current aircraft operating conditions, ambient conditions, and engine operating conditions. Each feature and structure of the propulsion system 35 operates within physical constraints. The constraints vary during system operation. Accordingly, the control system 25 generates the control commands 45 based on the various inputs and constraints for the specific operating condition.

Figure 2:
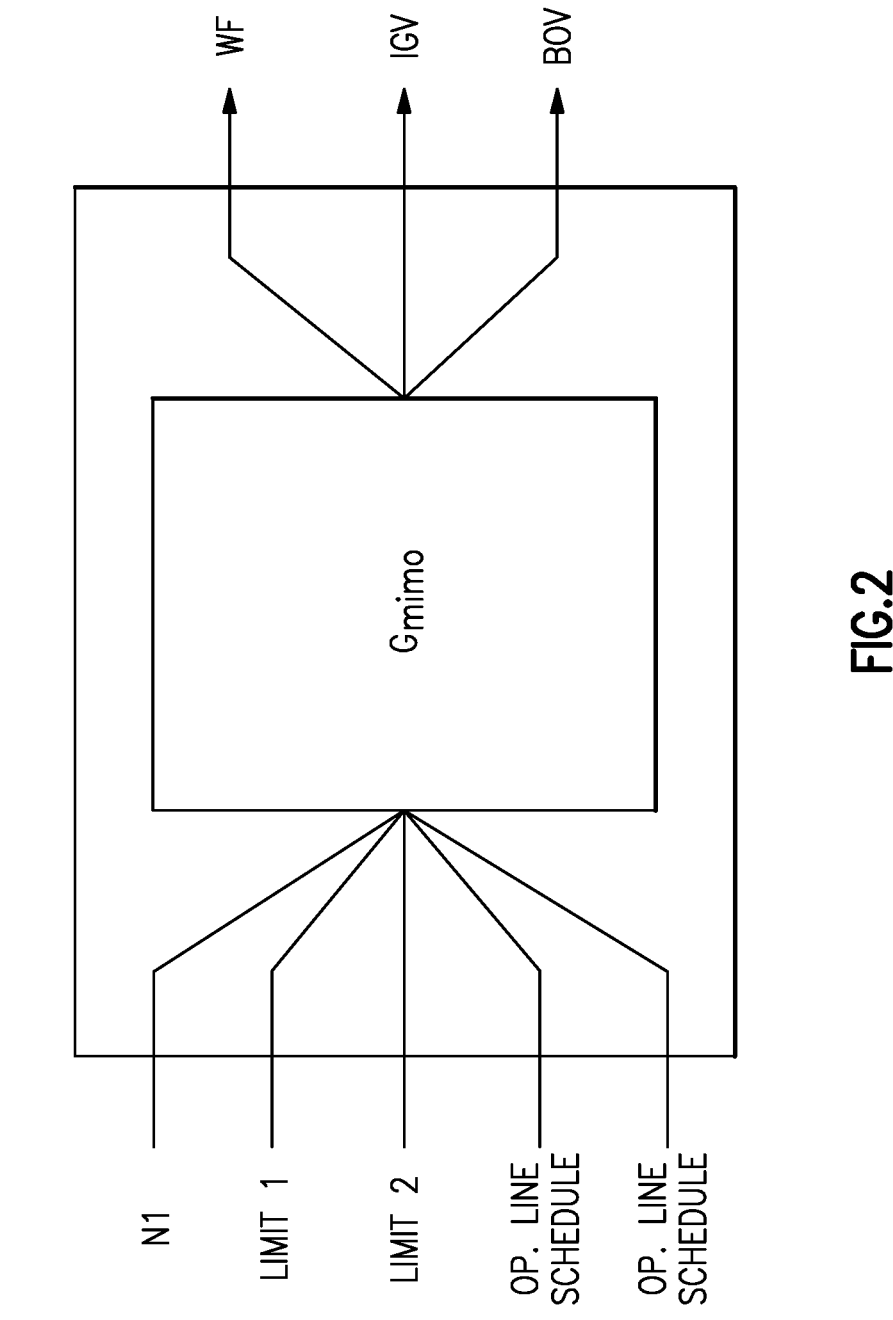
FIG. 2 is a schematic representation of an example constraint-based model with multi-variable input output control structure.

Referring to FIG. 2, the CBMC system 42 general architecture is schematically shown and provides a multi-input/multi-output control structure (G mimo) that provides multiple control outputs based on multiple inputs. The CBMC system 42 solves control requests simultaneously and provides integrated coordination of actuators. Inputs, also referred to as goals, include, for example and among other possible things, shaft speed N1 and a variable guide vane (VGV) reference. Limits are provided as maximum and minimum allowed values and are of higher priority than the goals.

Outputs are provided as commands that set a fuel flow (WF) or control systems. For example, the outputs may provide commands for control of an inlet guide vane system (IGV) or a control valve such as a blow off valve (BOV). The CMBC system 42 decouples naturally cross-coupled nonlinear, multivariate systems and provides the ability to run tight to physical and operational limits and reduce overshooting desired outputs. The example CMBC system 42 further provides an improved robustness across an engine operational envelope and accommodates engine-to-engine variations and engine deterioration.

Figure 3:
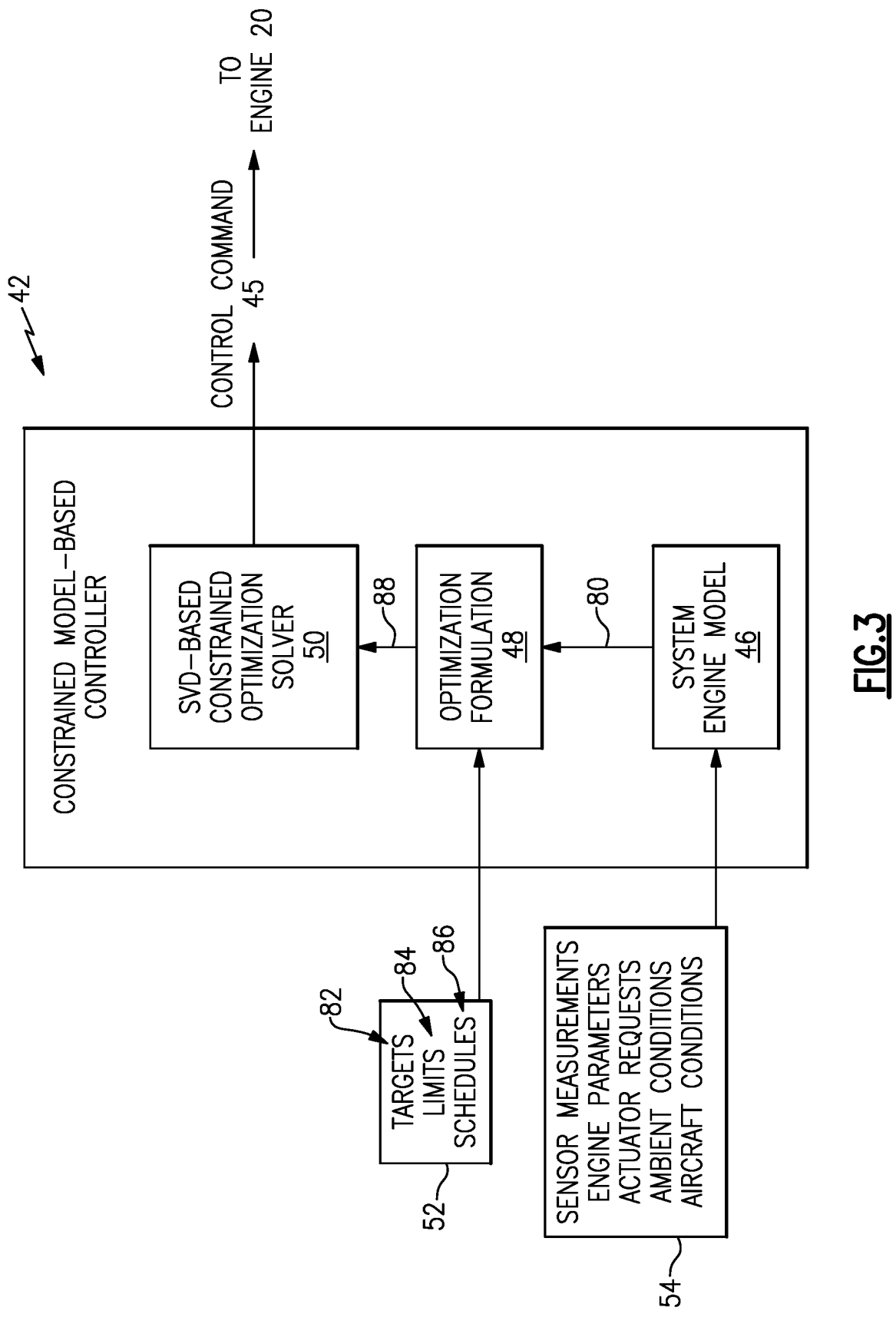
FIG. 3 is a schematic view of an example constrained model-based controller embodiment.
Figure 4:
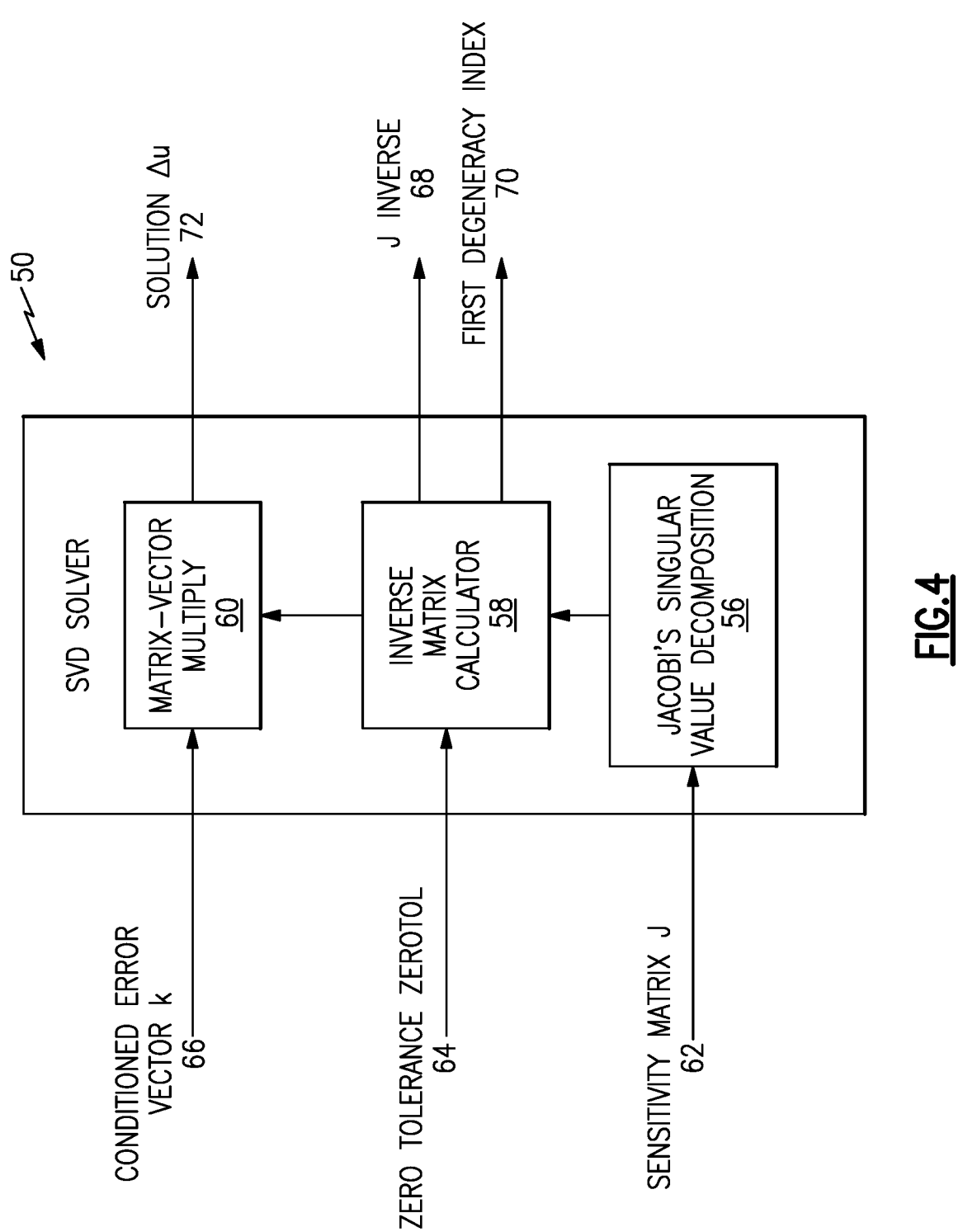
FIG. 4 is a schematic view of an example singular value decomposition solver embodiment.

Referring to FIG. 3 with continued reference to FIGS. 1 and 2, the CMBC system 42 is schematically shown and includes a system engine model 46, an optimization formulation module 48 and an SVD-based constrained optimization solver 50.

The system engine model 46 provides a mathematical representation of engine dynamic operation for a set of inputs 54. The system engine model 46 may provide a predicted outcome based on ambient conditions, aircraft conditions, and/or engine operating parameters. The example inputs 54 may include sensor measurements, engine operating parameters, actuator requirements, ambient conditions and/or aircraft conditions along with other inputs that may factor into an output of the engine 20. The system engine model 46 generates an output 80 that is supplied to the optimization formulation module 48. The output 80 is indicative of the system engine model 46 and operation based on the inputs 54.

The optimization formulation module 48 may also receive inputs 52. The inputs 52 may include an engine performance target 82, operating limits 84 and/or operational schedules 86. The optimization formulation module 48 determines at least one optimization problem which the optimization solver 50 may solve. The optimization formulation module 48 may determine the optimization problem based on the model output 80 and the inputs 52 including the performance target, operating limits and/or the operational schedules. The optimization formulation module 48 communicates the optimization problem indicated at 88 to the solver 50.

The constrained optimization solver 50 receives the optimization problem 88 and generates a solution utilized to define the control commands 45. The solver 50 generates the solution while remaining within constraints and limits that were implemented as part of the optimization problem 88.

The example CMBC system 42 utilizes an internal model having a Base-point discrete linear state-space model structure as follows:

$$x = \Delta t[A(x_{LP} - x_b) + B(u - u_b)] + x_{LP}$$

$$y = C(x - x_b) + D(u - u_b) + y_b$$

Where y is the output vector, $y_b$ is the output vector at linearization point (base-point);

x is the state vector, $x_b$ is the state vector at linearization point (base-point);

u is the input vector, $u_b$ is the input vector at linearization point (base-point); and A, B, C and D are the partial derivatives at linearization point as provided below.

$$A = \{a_{ij}\} = \left\{ \frac{\partial xdot_i}{\partial x_j} \right\}$$

$$B = \{b_{il}\} = \left\{ \frac{\partial xdot_i}{\partial u_l} \right\}$$

$$C = \{c_{kj}\} = \left\{ \frac{\partial y_k}{\partial x_j} \right\}$$

$$D = \{d_{kl}\} = \left\{ \frac{\partial y_k}{\partial u_l} \right\}$$

States and outputs are calculated from a sum of partial effects of each state or inputs deviation from base-point; e.g.:

$$y_k = \sum_j \left\{ \frac{\partial y_k}{\partial x_j} \right\}(x_j - x_b) + \sum_l \left\{ \frac{\partial y_k}{\partial u_l} \right\}(u_l - u_b) + y_b$$

The dynamic inversion problem formulation starts with linear plant model:

$$X_{n+1} = Ax_n + Bu_n$$

$$Y_n = Cx_n + Du_n$$

Transformed to delta form provides:

$$\Delta y_{n+1} = C_{n+1} = D(u_n + \Delta u_{n+1}) - y_n$$

The "perfect" controller can be realized by inverting the above relationships depending on whether the output is of Type I or II. The type designation of a system output depends on whether it is directly affected by effector requests (i.e., plant inputs) or indirectly through the system states. If it is directly affected by request, that output is considered a Type I; i.e., it takes 1 time step for an input to propagate to the output. If an input only affects an output through states; i.e., taking 1 time step for an input to propagate to the states, and another 1 time step from the change in states to propagate to the output, then the output is considered a Type II. Outputs can be either the goal or the limits. The basic dynamic inversion is the pivotal point of CMBC system 42. Subsequent CMBC "features" are built on top of the dynamic inversion.

A simplified formulation of the dynamic inversion equation, for output Type I and Type II, respectively provides:

$$\Delta u_{n+1} = (Db_A)^{-1} \{\min(\Delta y_{crl}, b_A \Delta y_{ref,n+1}) - (Cx_{n+1} + D\hat{u}_{n+1} - y_n)\}$$

$$\Delta u_{n+1} =$$

$$\underbrace{(CBb_A)^{-1}}_{J—\text{Sensitivity matrix}} \quad \underbrace{\{\min(\Delta y_{crl}, b_A \Delta y_{ref,n+2}) - (C(Ax_{n+1} + B\hat{u}_{n+1}) - y_{n+1}]\}}_{k—\text{"conditioned" error vector}}$$

Where: $\Delta y\_ref,n+1$ and $\Delta y\_ref,n+2$ are used to designate the control error to the desired reference (set point) at the planning horizon for output Type I and Type II, respectively; bA is a pre-designed first-order filter gain given by:

$$b_A = 1 - \exp(-\omega_{gl}\Delta T) \le 1.0$$

$\omega gl$ [rad./sec] is the pre-specified (designed) response bandwidth, and $\Delta T$ is the discrete sample-time;

ycrl is the corrected rate limiting vector (e.g., minimum/maximum fuel flow rate) used for high limiting the asymptotic reference errors b_$A\Delta y$_ref,n+1 and b_$A\Delta y$_ref,n+2 below $\Delta y$_crl.

$\Delta u_{n+1} = (J)^{-1} k$ or, equivalently $J \Delta U_{n+1} = k$.

Control limiting is incorporated by converting to a constrained minimization problem as set out below:

$$\min_{\Delta u_{n+1}} \|J_{active}\Delta u_{n+1} - k_{active}\|_Q^2$$

$$\text{s.t. } J_{con}\Delta u_{n+1} \le k_{con}$$

Where:

J_active is the active set output to input sensitivity matrix;

k_active is the active set conditioned error output vector;

J_con is the constraint output to input sensitivity matrix;

k_con is the constraint conditioned error output vector. Also let J_goal be the goal output to input sensitivity matrix and let k_goal be the goal conditioned error output vector.

A functional summary of the actions of the example solver includes the steps of calculating $\Delta U_{n+1}$ to achieve desired output trajectory correction kgoal, and kcon based on sensitivities J goal, J con. Satisfying the goal equality relationship $J_{goal} \Delta U_{n+1} = k$ goal unless the resulting unconstrained solution violates limits $J_{con} \Delta U_{n+1} > k_{con}$. The above calculations are implemented such that they do not violate the inequality constraints: $J_{goal} \Delta U_{n+1} \le K_{con}$. The calculations are accomplished to respect any locked limits such as, Jgoal $\Delta U_{n+1} \le K_{con}$, locked. Finally, if no feasible solution can be found, a back-up solver is utilized. The back-up solver may be an alternate solver based on a loop-select approach with pre-defined prioritized order of constraints.

Referring to FIG. 3, the solver 50 is schematically shown to illustrate separate modules and process steps. The disclosed solver 50 is a singular value decomposition (SVD) that solves linear optimization problem utilizing Jacobi's SVD method. The solver includes a Jacobi's singular decomposition module 56, an inverse matric calculator 58 and a matrix vector multiplication module 60. The solver 50 generates a solution 72 for linear equations provided as the optimization problem 88. The linear equations are set out in the following form:

$$J \Delta u = k$$

with square sensitivity matrix J of size N and conditioned error vector k of size N. The Jacobi's singular value decomposition module gives an SVD factorization of a N×N matrix J as:

$$J = U D V^T$$

where U and V are orthogonal N×N matrices ($U^T U = UU^T = I$; $V^T V = VV^T = I$), and D is a diagonal N×N matrix of the following form:

$$D = \begin{bmatrix} \lambda_1 & \dots & 0 \\ \vdots & \ddots & \vdots \\ 0 & \dots & \lambda_N \end{bmatrix}.$$

The inverse matrix calculator module 58 gives $J^{-1}$ as:

$$J^{-1} = V \begin{bmatrix} d_1 & \cdots & 0 \\ \vdots & \ddots & \vdots \\ 0 & \cdots & \lambda_N \end{bmatrix} U^T$$

which yields the CMBC SVD Solver solution 72:

$$\Delta u = V \begin{bmatrix} d_1 & \cdots & 0 \\ \vdots & \ddots & \vdots \\ 0 & \cdots & d_N \end{bmatrix} U^T k$$

With $$d_i = \begin{cases} \dfrac{1}{\lambda_i} & \text{if } |\lambda_i| \geq \text{ZEROTOL} \\ 0 & \text{else} \end{cases}$$

where ZEROTOL (for example, ZEROTOL=0.00005) is the zero tolerance used to avoid division by zero (or near zero) and detect matrix degeneracy.

Moreover, the index indicating first degeneracy 70 is given by:

$$\text{First Degeneracy Index} = \begin{cases} i & \text{first } i \text{ if } |\lambda_i| < \text{ZEROTOL} \\ 0 & \text{else} \end{cases}$$

The first degeneracy detection index is used for degeneracy detection and accommodation. The singular values are the diagonal entries of the D matrix and are arranged in descending order. If any singular value $\lambda_i$ is found to be less than the zero tolerance ZEROTOL, then the CMBC SVD Solver sets the associated element of $d_i$ to 0 and the First Degeneracy Index indicator is set to the index i. The First Degeneracy Index is used in the CMBC algorithm to update the CMBC calculations for the next iteration in case degeneracy occurs (i.e., First Degeneracy Index is non-zero). It also gives the control system designer an intuition which can be used in tuning the CMBC parameters.

The solver 50 iterates on an active set of limits by setting an initial set of active limits. The initial active set of limits is unconstrained and operates for a fixed number of iterations. On each iteration, the candidate active set is used to select a set of NU×NU equality constraints J dUrq=K from constraint (Jcon/Kcon) and goal (Jgoal/Kgoal) candidates. For each active limit, find first an 'active' goal in associated row of table and set LOOP to indicate limit causing goal drop. A candidate solution dUrq for J dUrq=K is calculated using the disclosed SVD solver 50. Any degeneracy is detected and accommodated. A slack limit is calculated as: slack=Kcon−Jcon dUrq (negative slack indicates violated limit).

If any limits are violated, the most violated limit (most negative slack) is added to the active set and a change in dUrq is scaled back to be consistent with that limit. If no limits are to be added to the active set on this iteration, a limit may be dropped from the active set if doing so will not cause that limit to be violated.

The solution to the optimization problem is indicated at 72 and is utilized to generate the control commands 45 (FIG.

3). The $\Delta u = u - u_b$ gives the control commands, where u is the input vector, and $u_b$ is the input vector at a linearization point (base-point).

The use of Jacobi's SVD method 56 provides a more efficient, accurate and robust means of solving the linear equations formulated by the optimization formulation module 48. Moreover, the Jacobi's SVD method is less susceptible to error.

Accordingly, the disclosed control system provides control commands based on solutions to generated systems of linear equations using Jacobi's SVD to provide increased accuracy and robust solutions.

A method for controlling an aircraft propulsion system 35 according to an exemplary embodiment of this disclosure includes, among other possible things, receiving a target output for at least one propulsion system operating parameter, receiving operation information indicative of at least one measured engine operating parameter, modeling dynamics of the propulsion system 35 with a system model, formulating a problem for achieving the target output as a system of linear equations constrained by physical limits of the propulsion system 35, generating a solution to the system of linear equations with a singular value decomposition solver module that utilizes Jacobi's singular value decomposition, and generating at least one control command 45 that is based on the generated solution. The at least one control command 45 includes instructions for adjusting that at least one propulsion system operating parameter toward the target output, and operating the propulsion system 35 according to the at least one control command 45.

A further embodiment of the foregoing method includes generating the solution by determining a factorization of a sensitivity matrix and a conditioned error vector.

A further embodiment of any of the foregoing methods includes determining an inverse matrix and a first degeneracy index with an inverse matrix calculator 58.

A further embodiment of any of the foregoing methods includes generating the solution at least partially based on a conditioned error Vector.

A further embodiment of any of the foregoing methods includes solving an input sensitivity matrix with the Jacobi's singular value decomposition.

In a further embodiment of any of the foregoing methods, the system model utilizes information that is indicative of the at least one measured engine operating parameter, ambient conditions actuator requests, aircraft conditions and sensor measurements.

In a further embodiment of any of the foregoing methods, formulating the problem further includes receiving the target output, system limits, system schedules and the system model.

A control system for an aircraft propulsion system according to another exemplary embodiment of this disclosure includes, among other possible things, a controller 34 that including a processor and a memory for storing control logic for generating control commands for operating a propulsion system 35. The controller 34 is programmed to receive a target output for at least one propulsion system operating parameter, to receive operation information indicative of at least one measured engine operating parameter, to model dynamics of the propulsion system 35 with a system model, to formulate a problem for achieving the target output as system of linear equations constrained by physical limits of the propulsion system 35, to generate a solution to the system of linear equations with a singular value decomposition solver module that utilizes Jacobi's singular value decomposition, and to generate at least one control command 45 that is based on the generated solution. The at least one control command 45 includes instructions for adjusting that at least one propulsion system operating parameter toward the target output, and to operate the propulsion system 35 according to the at least one control command 45.

In a further embodiment of the foregoing control system, the controller 34 includes a constrained model-based controller that has a system model module, an optimization formulation module 48 and a solver module 50.

In a further embodiment of any of the foregoing control systems, the controller 34 is further programed for generating the solution by determining a factorization of a sensitivity matrix and a conditioned error vector.

In a further embodiment of any of the foregoing control systems, the controller 34 is further programmed for determining an inverse matrix and a first degeneracy index with an inverse matrix calculator 58.

In a further embodiment of any of the foregoing control systems, the controller 34 is further programmed to generate the solution at least partially based on a conditioned error vector.

In a further embodiment of any of the foregoing control systems, the controller 34 is further programmed for solving an input sensitivity matrix with the Jacobi's singular value decomposition.

In a further embodiment of any of the foregoing control systems, the system model utilizes information indicative of the at least one measured engine operating parameter, ambient conditions actuator requests, aircraft conditions and sensor measurements.

In a further embodiment of any of the foregoing control systems, the controller 34 is further programmed to formulate the problem by receiving the target output, system limits and system schedules and the system model.

An aircraft propulsion system 35 according to another exemplary embodiment of this disclosure includes, among other possible things, a turbine engine 20 that is configured to generate a propulsive thrust based on at least one performance target, and a controller 34 that includes a processor 36 and a memory 38 for a storing a constrained model-based control system for generating control commands for operating the turbine engine 20. The constrained model-based control system includes an engine model 46, an optimization formulation module 48 and a solver module 50. The controller 34 is programmed to receive a target output for at least one turbine engine operating parameter, to receive operation information that is indicative of at least one measured engine operating parameter, to model dynamics of the turbine engine 20 with a system model, to formulate a problem for achieving the target output as a system of linear equations that is constrained by physical limits of the turbine engine 20, to generate a solution to the system of linear equations with a singular value decomposition solver module utilizing Jacobi's singular value decomposition, and to generate at least one control command 45 based on the generated solution. The at least one control command 45 includes instructions for adjusting that at least one turbine engine operating parameter toward the target output, and to operate the turbine engine 20 according to the at least one control command 45.

In a further embodiment of the foregoing aircraft propulsion system, the controller 34 is further programed to generate the solution by determining a factorization of a sensitivity matrix and a conditioned error vector, determining an inverse matrix and a first degeneracy index with an inverse matrix calculator 58 and to solve an input sensitivity matrix with the Jacobi's singular value decomposition.

In a further embodiment of any of the foregoing aircraft propulsion systems, the engine model 46 utilizes information that is indicative of the at least one measured engine operating parameter, ambient conditions, actuator requests, aircraft conditions and sensor measurements.

In a further embodiment of any of the foregoing aircraft propulsion systems, the control system 25 is further programmed to formulate the problem by receiving the target output, system limits, system schedules and the engine model 46.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method for controlling an aircraft propulsion system with a controller, the method comprising:
  receiving a target output for at least one propulsion system operating parameter;
  receiving operation information indicative of at least one measured engine operating parameter;
  modeling dynamics of the propulsion system with a system model;
  determining an output designation of the target output to be one of a Type I or a Type II, wherein the Type I designation comprises a target output that directly affects the at least one propulsion system operating parameter and the Type II designation comprises a target output that takes additional time steps to propagate to affect the at least one propulsion system operating parameter;
  formulating a problem for achieving the target output as a system of equations constrained by physical limits of the propulsion system based in part on the determination of the output designation being one of the Type I or Type II;
  generating a solution to the system of equations with a singular value decomposition solver module utilizing Jacobi's singular value decomposition;
  generating at least one control command based on the generated solution, the at least one control command includes instructions for adjusting that at least one propulsion system operating parameter toward the target output; and
  operating the propulsion system according to the at least one control command.

2. The method as recited in claim 1, further comprising generating the solution by determining a factorization of a sensitivity matrix and a conditioned error vector.

3. The method as recited in claim 2, further comprising determining an inverse matrix and a first degeneracy index with an inverse matrix calculator.

4. The method as recited in claim 3, further comprising generating the solution at least partially based on a conditioned error vector.

5. The method as recited in claim 4, further comprising solving an input sensitivity matrix with the Jacobi's singular value decomposition.

6. The method as recited in claim 5, wherein the system model utilizes information indicative of the at least one measured engine operating parameter, ambient conditions actuator requests, aircraft conditions and sensor measurements.

7. The method as recited in claim 6, wherein formulating the problem further comprises receiving the target output, system limits, system schedules and the system model.

8. A control system for an aircraft propulsion system comprising:

a controller including a processor and a memory for storing a control logic for generating control commands for operating a propulsion system, wherein the controller is programmed to:

receive a target output for at least one propulsion system operating parameter;

receive operation information indicative of at least one measured engine operating parameter;

model dynamics of the propulsion system with a system model;

determine an output designation of the target output to be one of a Type I or a Type II, wherein the Type I designation comprises a target output that directly affects the at least one propulsion system operating parameter and the Type II designation comprises a target output that takes additional time steps to propagate to affect the at least one propulsion system operating parameter;

formulate a problem for achieving the target output as a system of equations constrained by physical limits of the propulsion system based in part on the determination of the output designation being one of the Type I or Type II;

generate a solution to the system of equations with a singular value decomposition solver module utilizing Jacobi's singular value decomposition;

generate at least one control command based on the generated solution, the at least one control command includes instructions for adjusting that at least one propulsion system operating parameter toward the target output; and operate the propulsion system according to the at least one control command.

9. The control system as recited in claim 8, wherein the controller comprises a constrained model-based controller having a system model module, an optimization formulation module and a solver module.

10. The control system as recited in claim 9, wherein the controller is further programed for generating the solution by determining a factorization of a sensitivity matrix and a conditioned error vector.

11. The control system as recited in claim 10, wherein the controller is further programmed for determining an inverse matrix and a first degeneracy index with an inverse matrix calculator.

12. The control system as recited in claim 11, wherein the controller is further programmed to generate the solution at least partially based on a conditioned error Vector.

13. The control system as recited in claim 12, wherein the controller is further programmed for solving an input sensitivity matrix with the Jacobi's singular value decomposition.

14. The control system as recited in claim 13, wherein the system model utilizes information indicative of the at least one measured engine operating parameter, ambient conditions actuator requests, aircraft conditions and sensor measurements.

15. The control system as recited in claim 14, wherein the controller is further programmed to formulate the problem for achieving the target output by receiving the target output, system limits, system schedules and the system model.

16. An aircraft propulsion system comprising:

a turbine engine configured to generate a propulsive thrust based on at least one performance target; and a controller including a processor and a memory for storing a constrained model-based control system for generating control commands for operating the turbine engine, wherein the constrained model-based control system includes an engine model, an optimization formulation module and a solver module, the controller is programmed to:

receive a target output for at least one turbine engine operating parameter;

receive operation information indicative of at least one measured engine operating parameter;

model dynamics of the turbine engine with a system model;

determine an output designation of the target output to be one of a Type I or a Type II, wherein the Type I designation comprises a target output that directly affects the at least one propulsion system operating parameter and the Type II designation comprises a target output that takes additional time steps to propagate to affect the at least one propulsion system operating parameter;

formulate a problem for achieving the target output as a system of linear equations constrained by physical limits of the turbine engine based in part on the determination of the output designation being one of the Type I or Type II;

generate a solution to the system of linear equations with a singular value decomposition solver module utilizing Jacobi's singular value decomposition;

generate at least one control command based on the generated solution, the at least one control command includes instructions for adjusting that at least one turbine engine operating parameter toward the target output; and operate the turbine engine according to the at least one control command.

17. The aircraft propulsion system as recited in claim 16, wherein the controller is further programed to generate the solution by determining a factorization of a sensitivity matrix and a conditioned error vector, determining an inverse matrix and a first degeneracy index with an inverse matrix calculator and to solve an input sensitivity matrix with the Jacobi's singular value decomposition.

18. The aircraft propulsion system as recited in claim 17, wherein the engine model utilizes information indicative of the at least one measured engine operating parameter, ambient conditions, actuator requests, aircraft conditions and sensor measurements.

19. The aircraft propulsion system as recited in claim 18, wherein the control system is further programmed to formulate the problem for achieving the target output by receiving the target output, system limits, system schedules and the engine model.

* * * * *